United States Patent Office 2,901,851
Patented Sept. 1, 1959

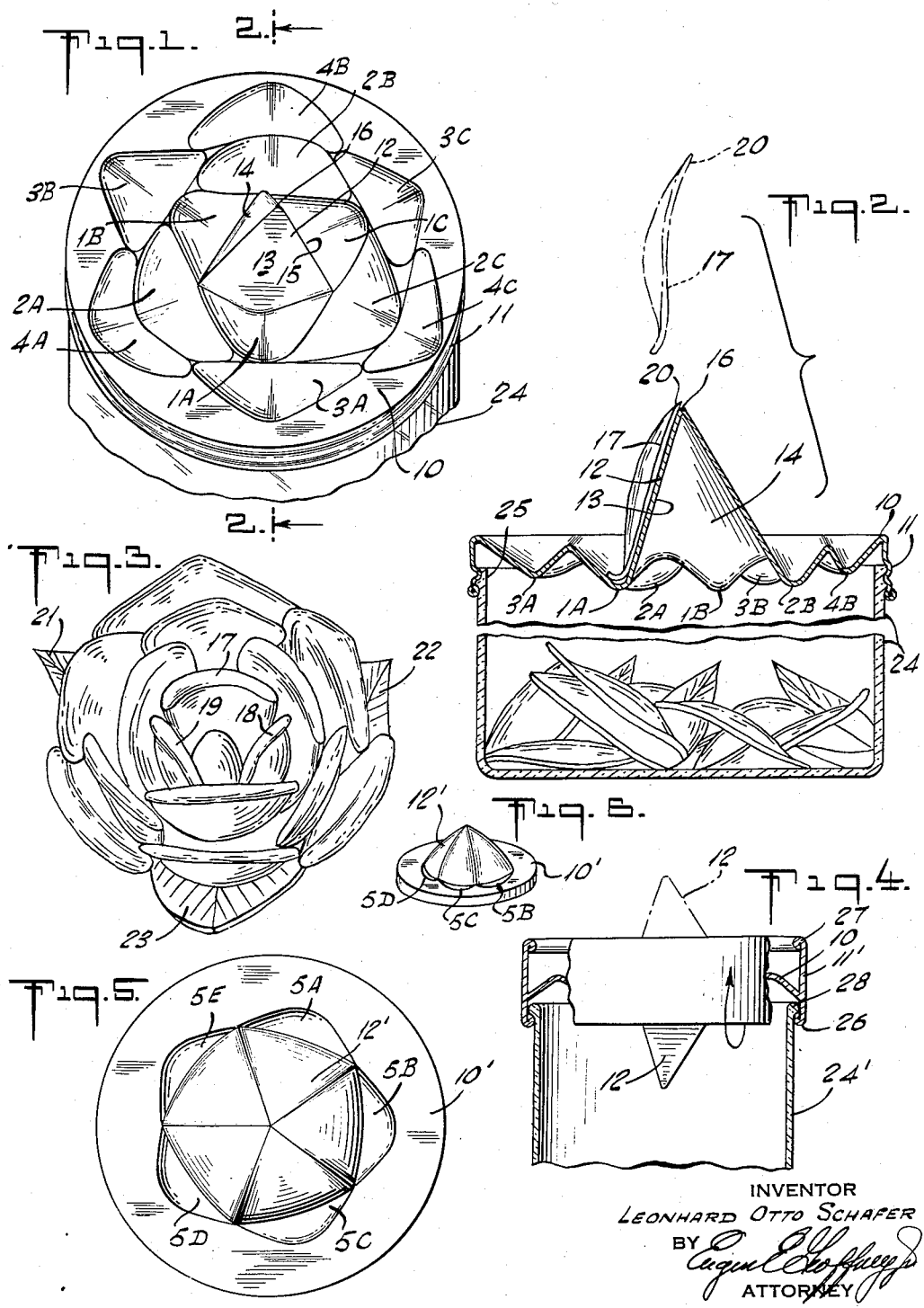

2,901,851

APPARATUS FOR ASSEMBLING PRE-FORMED PARTS OF PULLED SUGAR CANDY

Leonhard Otto Schafer, Bronx, N.Y.

Application July 30, 1956, Serial No. 600,864

8 Claims. (Cl. 41—2)

This invention relates to the manufacture of articles of candy such as flowers and the like and more specifically to improved apparatus for assembling pre-formed parts of pulled sugar candy to form interesting and attractive designs.

As pointed out in my prior application for U. S. Patent Serial No. 368,772, dated July 17, 1953, now U. S. Patent No. 2,803,202, entitled, Method and Apparatus for Forming Ornamental Objects, flowers and other articles were generally fabricated entirely by hand and required skilled personnel. Because of the relatively high temperatures required to form the candy, workers could function only for limited periods of time with the result that the cost of the article was relatively high. The above mentioned application sets forth an improved method and apparatus for forming pulled sugar candy into flower petals and other shapes that not only reduces the cost of the resultant article but provides the candy with an improved surface that materially retards the absorption of moisture encountered with hand worked candy with the result that the formed articles will maintain their shape and contour for extended periods even in warm humid atmospheres.

In the case of flowers, the fabrication of flower parts to form a finished flower has presented a serious problem particularly in instances where the parts are to be assembled by inexperienced personnel or by persons in the home interested in the assembly of pre-formed pulled sugar candy parts as a hobby or for other purposes.

Accordingly one object of the invention resides in the provision of improved apparatus for the assembly of prefabricated pulled sugar candy parts that is characterized by its simplicity, practicability and relatively low cost. By reason of an improved arrangement and organization of elements the apparatus may be conveniently arranged as a cover for a container for the pulled candy parts with the container functioning as a support for the apparatus to facilitate its use and enable manipulation of the apparatus necessary during the assembly operation.

Another object of the invention resides in the provision of an improved device to facilitate the fabrication of flowers and other articles from pre-formed pulled sugar candy parts.

The above and other objects and advantages of the invention will become more apparent from the following description and accompanying drawings forming part of this application.

In the drawings:

Fig. 1 is a perspective view of one embodiment of the invention;

Fig. 2 is a cross sectional view of the embodiment shown in Fig. 1 taken along the line 2—2 thereof;

Fig. 3 is a perspective view of a finished pulled sugar candy rose in accordance with the invention;

Fig. 4 is a cross sectional view of a modified embodiment of the invention;

Fig. 5 is a plan view of apparatus in accordance with the invention for making an article different from that fabricated with the apparatus of Fig. 1; and Fig. 6 is a perspective view of the form of the invention shown in Fig. 5.

As pointed out above the invention concerns a novel and improved device for use in the formation of articles from pre-formed elements made of pulled sugar candy. Figs. 1 and 2 of the drawings illustrate a form of the invention for the fabrication of a full rose such as that shown in Fig. 3. It comprises a plate or base generally denoted by the numeral 10 and having a depending flange 11 surrounding the edge thereof. Extending upwardly of the plate 10 there is a central member 12 which in this embodiment of the invention is of triangular configuration having three sides 13, 14 and 15 terminating in an apex 16. As will be shown as the description proceeds, this central member 12 supports the root ends of the petals during the fabrication of the rose in an inverted position. While it has been found convenient to fabricate this central member 12 in the form of a triangular cone, it is apparent that for making a rose such as that illustrated in Fig. 3 of the drawings any suitably shaped central member having the desired height may be employed for this purpose. For unskilled persons, however, it is desirable to use the triangular configuration when forming a full rose.

Surrounding the central member 12 there are three depressions or recesses 1A, 1B and 1C formed adjacent to the sides 13, 14 and 15 of this central member. The shape of the recesses are arranged to conform with the shape of the outer edges of the petals forming a rose such as the petals 17, 18 and 19 of Fig. 2 which comprise the three center petals of a rose as illustrated in Fig. 3. In forming these recesses the distance between the bottom of each recess and the apex 16 of the central member 12 should be uniform in length so that the petals will be properly positioned in the finished article. In Fig. 2 it will be observed that the petals lie flat against their respective sides of the central member and they are adhered together at their root ends 20 by heating the root ends slightly before placement of the petals in position. Fig. 2 shows the petal 17 in dotted outline about to be positioned on the forming apparatus, and in full outline in place on said apparatus.

A second group of recesses 2A through 2C are formed in the base 10 at a somewhat larger radius than the recesses 1A to 1C and are displaced therefrom by an angle of about 60°. The recesses 2A to 2C may be slightly shallower than the recesses 1 so that the distance between the base of each recess to the apex 16 of the central member 12 will permit the root ends of the outer petals to overlie and be supported by the root ends of the inner petals. The formation of the recesses in this way tends to provide a slight curvature on the top of the rose simulating that found in a natural rose and at the same time enables the outer petals to be firmly secured to the inner petals about the apex 16. This also permits adequate pressure to be applied to the root ends of the petals in securing them one to the other and insure a firm joinder of all petals.

Surrounding the recesses 2A to 2C there is a third group of recesses denoted as 3A, 3B and 3C that are spaced outwardly from the recesses 2A through 2C and are generally in alignment with the recesses 1A through 1C. A final group of recesses for alignment of the outer petals of the rose shown in Fig. 3 are denoted as recesses 4A, 4B and 4C. It will be observed from Fig. 2 of the drawings that the inner recesses 1A through 1C are substantially deeper than the outer recesses 4A through 4C. While it is preferable to arrange the several series of recesses or depressions in the manner described in order to obtain a generally convex configuration of the outer ends of the rose petals, it is apparent that the depth of the various series of recesses may be modified as desired in order to obtain an article of the desired shape and configuration.

After all of the petals are in place on the base 10 and secured one to the other by heating the root end of each petal as it is positioned in place and pressing it against the other petals already in place, simulated leaves of pulled shape sugar candy may be placed in position. These leaves are generally denoted by the numerals 21, 22 and 23 in Fig. 3 and preferably extend outwardly from the rose to form a three pointed support.

In the utilization of the forming apparatus shown in Fig. 1, it is desirable to rotate it during fabrication of the flower to facilitate the placement of the petals. For this purpose a cylindrical support in the form of a jar or receptacle 24 is provided with a diameter slightly less than the flange 11. For convenience in attaching the plate 10 to the top of the receptacle 24 cooperating screw threads or other suitable fastening means may be provided on the flange 11 and the cooperating edge 25 of the receptacle 24 as shown more clearly in Fig. 2. The use of a receptacle in this manner raises the forming apparatus to a convenient height and at the same time provides a container for petals, leaves, or other candy parts of the type used in the fabrication of the article being made. By making the plate 10 of the forming apparatus substantially air tight and providing suitable gasket members about the joinder of the flange 11 with the container top, placement of the forming apparatus 10 on the container will provide an air tight vessel that will preserve candy elements not used in the formation of an article. By properly packing the petals, leaves and other elements with the container 24, a container together with the forming apparatus as a cover can be provided as a complete unit for sale to individuals desiring to fabricate their own articles. In this way all of the necessary materials are provided with the exception of a source of heat.

A modified embodiment of the invention is shown in Fig. 4. In this embodiment of the invention the flange 11 has been replaced by a modified flange 11' of greater height so that the plate 10 can be reversed relative to the cooperating container 24'. In this embodiment of the invention the upper and lower edges of the flange 11' are provided with inwardly formed lips 26 and 27 which cooperate with the corresponding enlarged portion 28 about the top of the container 24 to hold the plate 10 in place thereon. With the forming apparatus as shown in Fig. 4 the central member 12 is in the downward direction for purposes of shipment and enables successive units to be stacked one upon the other with a minimum loss of space. When the forming apparatus is to be used it is inverted so that the rolled edge 27 of the flange 11' is in engagement with the upper edge of the container 24'.

To illustrate the versatility of this invention in the fabrication of different types of articles Figs. 5 and 6 illustrate forming apparatus for making a so-called open ice cream rose. In this case the central member denoted generally by the numeral 12' is a five sided figure extending upwardly from the plate 10' and accommodates five separate petals. The petals are aligned and supported at their lower ends by a series of recesses 5A through 5E inclusive. When the petals are in place against the central member 12 and securely fastened one to the others a set of three leaves, such as the leaves 21 to 23 of Fig. 3, may be secured to the root ends of the petals and extend outwardly to form a suitable base. The finished rose is in the form of a single series of petals which may be used as a decorative means for serving ice cream, fruit or other delicacies. In the fabrication of this modification of the invention it may be provided with a suitable flange 11 in the same manner as the flange 11 is formed on the base 10 of the embodiment of the invention shown in Fig. 1. While a five sided central member 12' has been illustrated in Figs. 5 and 6 it is apparent that the central member may include any number of sides and that additional series of recesses about the center may be provided if desired. A somewhat similar effect may be attained with the embodiment of the invention shown in Fig. 1 by omitting the series of petals usually engaged by the recesses 1A through 1C and 2A through 2C. This would form a slightly modified open rose for the reception of ice cream or other delicacies.

Although it is preferable in the fabrication of forming apparatus in accordance with the invention to form the central member and the petal receiving recesses in a relatively thin sheet of metal such as iron, copper or the like, it is apparent that the forming apparatus may be made in any other suitable manner as by casting metal, plastic or the like in the proper shape and configuration or machining the apparatus from a block of material.

While only certain embodiments of the invention have been illustrated and described, it is apparent that modifications, alterations and changes may be made therein without departing from the true scope and spirit thereof.

What is claimed is:

1. Apparatus for the assembly of flower petals formed of pulled sugar candy comprising a base, a central cone-shaped multi-sided member perpendicular to and extending upwardly from said base said sides intersecting at the outer end of said central member to form an apex and said base having a plurality of individual petal engaging depressions of generally triangular configuration for engaging the outer ends of the petals in the position normally assumed on the finished flower, at least certain of the last said depressions being aligned with the sides of said the central member whereupon each petal upon placement on the apparatus in an inverted position with the outer end engaged by one of the aforesaid depressions, the root end will rest against said central member in the position desired in the finished flower.

2. Apparatus according to claim 1 wherein said central member is generally conical in shape and includes at least three petal receiving surfaces.

3. Forming apparatus according to claim 1 wherein said petal engaging depressions formed in said base with the depressions are nearest said central member being deeper than the depressions farther from central member to maintain the distance between the bottom of each depression and the apex of said central member substantially uniform.

4. Forming apparatus according to claim 3 wherein said base includes at least three series of petal engaging depressions surrounding said central member and positioned at different distances from said central member with each series of petal engaging means accommodating at least three petals at uniform intervals about the central member and successive series of engaging means being angularly offset one from the others.

5. Forming apparatus for making pulled sugar candy flowers from pre-formed petals comprising a base having a flange about the periphery, supporting means for said base releasably secured to said flange, a central multi-sided member perpendicular to and extending upwardly from said base and a plurality of petal engaging depressions of generally triangular configuration on said base for engaging the outer ends of the petals in the position normally assumed in the finished flower, at least certain of the last said depressions being aligned with the sides of the central member so that each petal upon placement on the apparatus in an inverted position with the outer end engaged by one of the aforesaid depressions the root end will rest against said central member in the position desired in the finished flower, 6. Apparatus for the assembly of flower petals formed of pulled sugar candy comprising a base, a central cone-shaped multi-sided member extending outwardly of said base, the sides of said member having a generally triangular configuration to form a pointed end portion on said member, said base including a plurality of generally triangular depressions surrounding said central member for receiving the outer ends of the petals to be assembled, the depths of each of said depressions being coordinated with the distance from the pointed end portion of said central member to maintain substantially uniform distances between the bottom of each depression and said pointed end portion.

7. Apparatus according to claim 6 wherein said base includes a peripheral flange and a hollow support engaging said flange.

8. Apparatus according to claim 6 wherein said base is provided with peripheral flanges extending from each side of said base and a hollow supporting member engaging one of said flanges whereby said supporting member when in engagement with said one flange will hold the base and central member in position for assembly of flower petals and when in engagement with the other flange will hold the base and central member in a protected position.

References Cited in the file of this patent

UNITED STATES PATENTS

| | | | |
|---|---|---|---|
| D. 168,646 | Erickson | Jan. 20, | 1953 |
| 187,259 | Erlebach | Feb. 13, | 1877 |
| 816,996 | Plass | Apr. 3, | 1906 |
| 836,887 | Miller | Nov. 27, | 1906 |
| 1,694,844 | DeGerson | Dec. 11, | 1928 |
| 2,190,567 | Jung | Feb. 13, | 1940 |
| 2,282,657 | Kirchen | May 12, | 1942 |